J. MILLER.
HOSE COUPLING.
APPLICATION FILED MAY 15, 1911.
1,064,154.
Patented June 10, 1913.
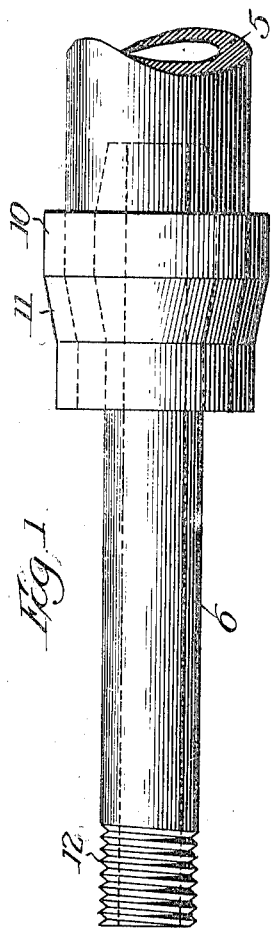
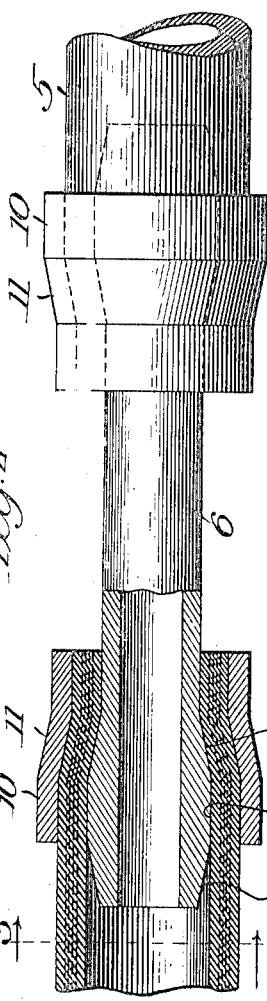
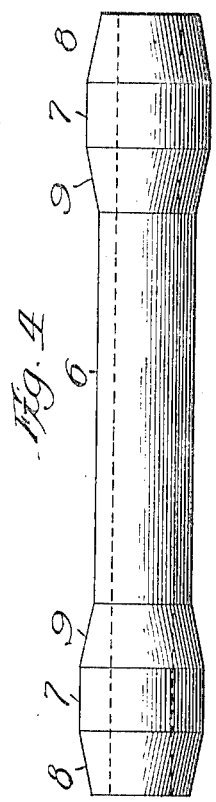
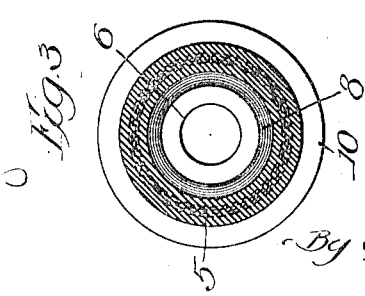

UNITED STATES PATENT OFFICE.

JOSEPH MILLER, OF CHICAGO, ILLINOIS.

HOSE-COUPLING.

1,064,154.   Specification of Letters Patent.   Patented June 10, 1913.

Application filed May 15, 1911. Serial No. 627,180.

*To all whom it may concern:*

Be it known that I, JOSEPH MILLER, a citizen of the United States, residing at Chicago, in the county of Cook and State of Illinois, have invented certain new and useful Improvements in Hose-Couplings, of which the following is a specification.

This invention relates to hose couplings and aims to produce a device of this character which shall be simple in construction and cheap to manufacture and which can be assembled without the employment of wrenches, pliers or any tools whatsoever.

The device is capable of being used with any kind of flexible hose such as train pipe hose, fire hose, garden hose, etc., and can be easily and quickly attached to a hose for connecting two sections thereof together or for connecting the hose to a nozzle or a hydrant, or other device.

The invention and its details of construction will be clearly understood from the following description when considered in connection with the accompanying drawings throughout the various views of which like reference characters refer to similar parts.

Referring to the drawings—Figure 1 is a side elevation of one preferred embodiment of my invention. Fig. 2 is a side elevation partially in section of another form of the invention. Fig. 3 is a sectional elevation on the line 3—3 of Fig. 2; and Fig. 4 is a side elevation of the shouldered tube.

On the drawings, 5 designates a section of flexible hose of any well known or preferred character and construction. A tube 6 made of metal, wood or other material, is provided near each end as shown in Figs. 2 and 4, with an enlargement or shoulder 7. The shoulder having a circumference of diameter substantially equal to the diameter of the hose 5 is tapered toward the end as indicated at 8 to facilitate the insertion of the tube into the end of a section of hose and is also tapered toward the center of the tube as indicated at 9 to prevent the tube from being withdrawn from the hose, as will be hereinafter explained. A circular sleeve or collar 10, preferably of integral construction, is made larger at one end than at the other, providing an intermediate tapered portion 11, the taper of which corresponds to the taper 9 of the tube. The larger end of the sleeve is made of sufficient size to readily slip over the end of the hose while the tapered portion and the smaller end serve to compress the end of the hose around the tube inserted therein.

In assembling the coupling the shouldered end of the tube 6 is first forced into the end of the hose farther than it will normally lie when the coupling is completed. The sleeve 10 is then slipped over the end of the hose until its smaller end is substantially flush with the end of the hose whereupon the tube is pulled outwardly until the walls of the hose are firmly clamped between the tapered portion 9 of the tube and the tapered portion 11 of the sleeve. The friction between the outer surface of the hose and the sleeve 10 will be sufficient to prevent the sleeve from slipping off and this friction will be increased proportionately to the force exerted upon the tube tending to withdraw it from the hose.

In the form of my invention disclosed in Figs. 2 and 4, both ends of the tube 6 are made alike, the coupling being adapted in this instance for the connection of two lengths of similar hose.

Inasmuch as the greatest diameter of the tube 6 is substantially equal to the inner diameter of the hose 5 it is apparent that the hose will not be stretched at any point when secured to the coupling, the end of the hose being drawn inwardly of the coupling by means of the collar 10. It will be readily understood also that any pull exerted upon the hose tending to withdraw the tube therefrom, will only cause the walls of the hose to be more firmly gripped between the tapered portions of the tube and sleeve and thereby cause a tightening of the joint and a more effectual seal. The introduction of fluid under pressure to the hose will automatically tighten the joint by reason of the fact that the fluid will press against the ends of the tube tending to force it out of the hose and thereby more tightly clamping the hose between the ring and tube as has been explained.

In the form of invention shown in Fig. 1 one end of the tube 6 is provided with a tapered shoulder for connection with a hose while the other end is threaded as indicated at 12, for threaded engagement with a pipe connection, a hydrant, a nozzle, or any other device.

It will be obvious that a nozzle itself may be provided with a tapered shoulder and can be attached directly to the hose by means of the tapered sleeve, if desired.

The invention and many of its advantages will be understood from the foregoing without further description and it will be obvious that various changes in the size, shape and proportion of the various parts may be resorted to without departing from the spirit of the invention or sacrificing any of the material advantages thereof.

I claim:

1. A hose coupling comprising a tube having an enlarged tapered portion and a cylindrical portion on each side of said tapered portion adapted to be inserted into the end of a hose, and an integral sleeve adapted to be slipped over the end of the hose, said sleeve having cylindrical ends of different internal diameters, said ends being connected by a tapered portion, the tapered portions of the sleeve and the tube being substantially parallel and serving to compress the walls of the hose therebetween.

2. A hose coupling comprising a tube having an enlarged tapered portion and a cylindrical portion on each side of said tapered portion adapted to be inserted into the end of a hose, and a sleeve adapted to be slipped over the end of the hose, said sleeve having cylindrical ends of different internal diameters connected by a tapered portion, the said tapered portions of the sleeve and tube having substantially the same inclination and being divided by an interspace less than the thickness of the hose and having substantially parallel walls adapted to compress the walls of the hose therebetween.

3. A hose coupling comprising a tube having an enlarged tapered portion and a cylindrical portion at each side of said tapered portion adapted to fit snugly within an end of the hose, and a sleeve adapted to be slipped over the end of the hose, said sleeve having a tapered portion adapted to compress the end of the hose and having cylindrical portions co-acting with the cylindrical portions of the tube to aid in securing the hose to the coupling, the tapered portions of the sleeve and tube serving to compress the walls of the hose therebetween without stretching the said walls.

4. The combination of a hose section and a hose coupling comprising a tube having an enlarged cylindrical portion of diameter equal substantially to the diameter of the bore of the hose, a tapered portion connected with said cylindrical portion, and a sleeve having a tapered portion and a cylindrical portion co-acting with the tapered portion and cylindrical portion of the tube to secure the section of the hose to the coupling, the tapered portions of the sleeve and tube serving to compress the walls of the hose and to clamp the same therebetween.

5. A hose coupling comprising a tube having an enlarged head adapted to be inserted in the end of a hose and having an external centrally disposed cylindrical surface, a frusto-conical surface extending from one side of said cylindrical surface to the end of the tube and a frusto-conical surface extending from the other side of the said cylindrical surface inwardly of the tube to the end of the enlarged head, and a sleeve adapted to be slipped over the end of the hose embracing the head and having cylindrical ends of different diameters connected by a tapered portion and being provided with internal surfaces parallel to the centrally disposed cylindrical surface of the head, the inner frusto-conical surface and the outer wall of the tube.

6. A hose coupling comprising a tube having an enlarged cylindrical portion, a tapered portion extending between the said cylindrical portion and the end of the tube, a second tapered portion extending inwardly of the tube from the other side of the said cylindrical portion, and a sleeve having a tapered portion and a cylindrical portion adapted to co-act respectively with the inner tapered portion and the cylindrical portion of the tube to clamp the end of a hose section therebetween, the outermost tapered portion of the tube being adapted to be acted upon by the pressure of the fluid passing through the hose to force the parts into more firm engagement.

JOSEPH MILLER.

Witnesses:
Wm. O. Belt,
M. A. Kiddie.